United States Patent
Kramarenko et al.

(10) Patent No.: US 8,688,079 B2
(45) Date of Patent: *Apr. 1, 2014

(54) SYSTEMS AND METHODS OF VOICE CALL SETUP INVOLVING MOBILE DEVICES

(75) Inventors: Valentina Iqorevna Kramarenko, Toronto (CA); Swee Tuan Pang, Oakville (CA); Gibran Siddique, Toronto (CA); Lap Luu, Markham (CA); Richard John George, Waterloo (CA)

(73) Assignee: BlackBerry Limited, Waterloo (CA)

( * ) Notice: Subject to any disclaimer, the term of this patent is extended or adjusted under 35 U.S.C. 154(b) by 497 days.

This patent is subject to a terminal disclaimer.

(21) Appl. No.: 12/951,319

(22) Filed: Nov. 22, 2010

(65) Prior Publication Data
US 2011/0263224 A1    Oct. 27, 2011

Related U.S. Application Data

(60) Provisional application No. 61/328,093, filed on Apr. 26, 2010, provisional application No. 61/328,555, filed on Apr. 27, 2010.

(51) Int. Cl.
*H04M 1/66* (2006.01)
*H04W 4/00* (2009.01)
*H04M 3/42* (2006.01)
*H04M 1/56* (2006.01)
*H04M 15/06* (2006.01)

(52) U.S. Cl.
USPC ........ 455/411; 455/410; 455/414.1; 455/415; 455/418; 455/422.1; 379/88.2; 379/142.05; 379/142.18; 379/219

(58) Field of Classification Search
USPC .............. 455/411, 410, 414.1, 415, 418–420, 455/422.1; 379/88.2, 142.05, 142.18, 379/219–221.01, 221.08, 221.11, 283, 379/124.05
See application file for complete search history.

(56) References Cited

U.S. PATENT DOCUMENTS

| 5,329,578 | A | 7/1994 | Brennan et al. |
| 8,180,406 | B2 * | 5/2012 | Lim et al. ...................... 455/567 |

(Continued)

FOREIGN PATENT DOCUMENTS

| DE | 102006060967 A1 | 6/2008 |
| EP | 1161068 A2 | 12/2001 |

(Continued)

OTHER PUBLICATIONS

Office Action mailed Sep. 13, 2012, in corresponding Canadian patent application No. 2,721,894.

(Continued)

*Primary Examiner* — Matthew Sams
(74) *Attorney, Agent, or Firm* — Novak Druce Connolly Bove + Quigg LLP

(57) ABSTRACT

A mobile device can send a notification to place a call using a PBX (e.g., using SIP signaling) or receive a notification of call availability for the mobile device at the PBX. An authentication token is provided over a data channel for use in authenticating the mobile device when calling the PBX on a voice channel. However, when the mobile device calls the PBX (e.g., on a DNIS number, where ANI information is made available to an application server), if ANI information is found to correspond to the mobile device, the PBX can send tone(s) indicating that the mobile device can respond with an abbreviated validation tone, rather than the entirety of the authentication token. If the ANI information is not obtained or not matched, then a different tone(s) is sent, indicating to provide the authentication token. If the authentication token provided does not match or if the mobile device does not respond, the voice channel is not set up.

16 Claims, 8 Drawing Sheets

(56) References Cited

U.S. PATENT DOCUMENTS

| | | | |
|---|---|---|---|
| 8,300,782 B2* | 10/2012 | Milton | 379/93.02 |
| 2006/0270388 A1* | 11/2006 | Veeramachaneni et al. | 455/412.1 |
| 2007/0223401 A1* | 9/2007 | Chatterjee et al. | 370/261 |
| 2008/0119165 A1* | 5/2008 | Mittal et al. | 455/411 |
| 2009/0156164 A1* | 6/2009 | Bajpai et al. | 455/411 |
| 2009/0181648 A1* | 7/2009 | Bao et al. | 455/414.1 |
| 2011/0143714 A1* | 6/2011 | Keast et al. | 455/411 |
| 2011/0143715 A1* | 6/2011 | Labrador et al. | 455/411 |
| 2011/0263223 A1* | 10/2011 | Lim et al. | 455/411 |
| 2011/0280151 A1* | 11/2011 | Medynski et al. | 370/254 |

FOREIGN PATENT DOCUMENTS

| | | |
|---|---|---|
| KR | 20030056646 A | 7/2003 |
| WO | WO 2006070187 A1 * | 7/2006 |

OTHER PUBLICATIONS

Extended European Search Report mailed Dec. 5, 2012, in corresponding European patent application No. 10192129.4.

Notice of Allowance and Fee(s) Due mailed Dec. 5, 2012, in corresponding Canadian patent application No. 2,721,894.

* cited by examiner

SYSTEMS AND METHODS OF VOICE CALL SETUP INVOLVING MOBILE DEVICES

CROSS REFERENCE TO RELATED APPLICATIONS

This application claims priority from U.S. Provisional Pat. App. Ser. No. 61/328,093, filed on Apr. 26, 2010 and U.S. Provisional Pat. App. Ser. No. 61/328,555, filed on Apr. 27, 2010; the contents of both applications are incorporated herein in their entirety for all purposes.

BACKGROUND

1. Field

The present application relates to voice telephony, and more particularly to transport setting up and authorizing of voice calls involving mobile devices.

2. Related Art

Voice telephony remains a major application of interest for business and personal use. In an example corporate setting, a telephony installation at a site can have a large number of users connected to a Private Branch Exchange (PBX) server, which can interface those users to a smaller number of outside lines (e.g., an E1 or T1 line) (a PBX can be implemented using a server with telephony cards for example). A PBX can interface with other servers and systems, such as one or more application servers that can provide enhanced services to devices connected to the PBX, such as mobile devices. For example, a PBX can interface with an application server over an IP connection, using SIP signaling. Services provided by an application server can include third party call control, enterprise voice mail, single number reachability, call forwarding, park, and conferencing, for example. PBX systems also can communicate with each other over trunk lines, and packet networks, depending on implementation.

A PBX can perform services for a voice call, based on direction from an application server. For example, a PBX can initiate an outgoing call to a number specified by an application server using SIP signaling to the PBX. A PBX also can provide information about incoming calls to an application server. For example, a PBX can provide ANI information, to an application server, for a call incoming to the PBX, which may be provided a service by the application server. Where data communication is unavailable with a mobile device, the mobile device would not have an IP address (or more generally, where mobile device cannot acquire an IP address), authentication mechanisms available in SIP cannot be used.

It is desirable to provide an experience to devices being serviced from such systems that is responsive, while also maintaining a measure of authentication to be able to use the systems, to reduce undesirable situations such as abuse or unauthorized access.

BRIEF DESCRIPTION OF THE DRAWINGS

Reference will now be made, by way of example, to the accompanying drawings which show example embodiments of the present application, and in which.

DESCRIPTION

Figure 1:
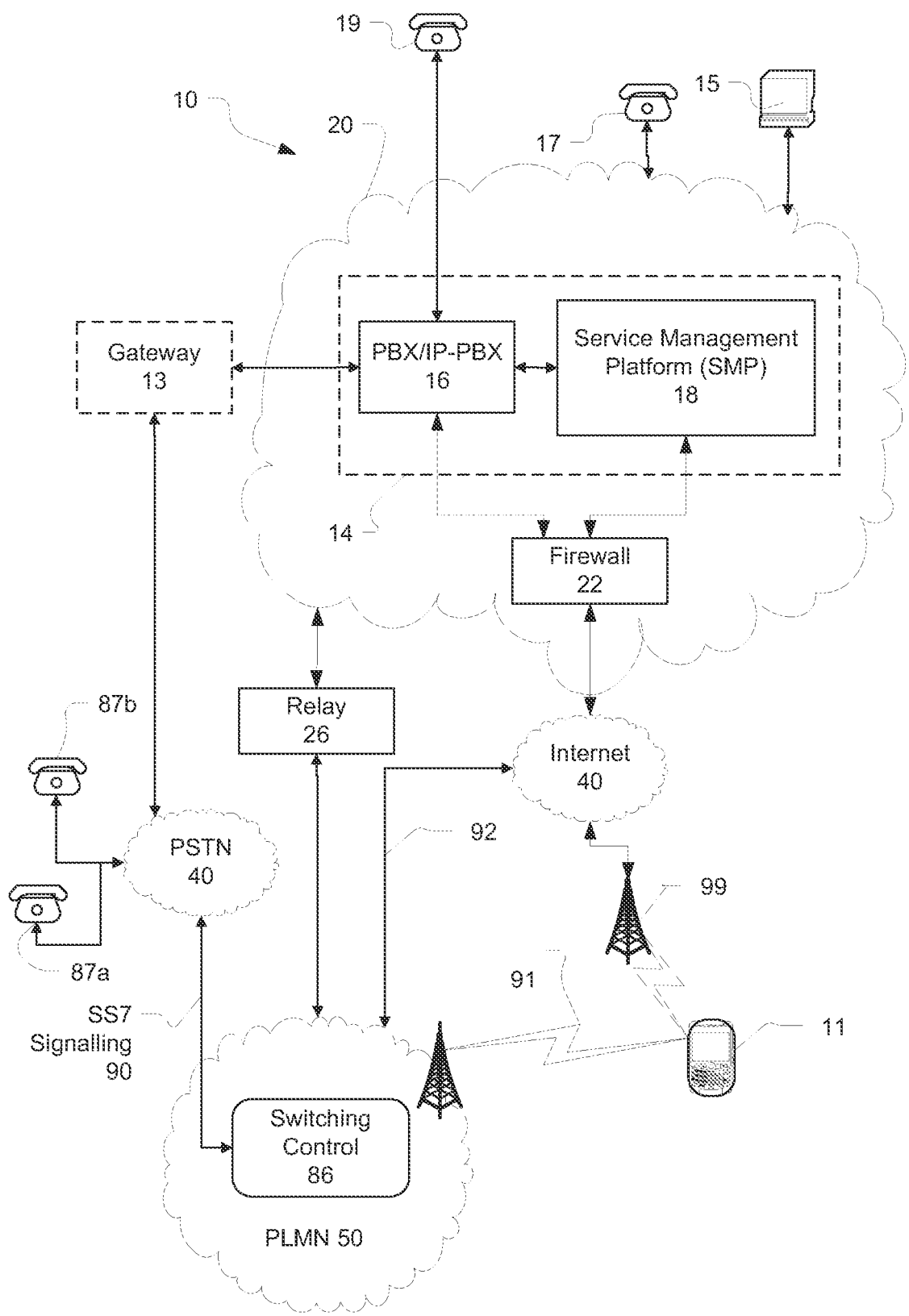
FIG. 1 shows, in block diagram form, an example arrangement in which voice calls involving mobile devices can be setup, and which involves an enterprise communications platform.

Briefly, one concern in providing enhanced telephony services to mobile devices is providing a responsive experience to users of the mobile devices. For example, in a situation where a call is to be anchored from a PBX, a mobile device (calling party) can indicate that a call to a specified number (a called party) is to be made from the PBX on behalf of the calling party, and that a voice channel between the PBX and each of the called and calling party should be bridged so that the called and calling party are in voice communication.

In one approach to such a service (e.g., where SIP authentication measures cannot be applied), a mobile device can indicate, through a data channel (e.g., a data service), to a server in communication with the PBX that such a call is to be made. The server can return, via the data channel, an authentication token that can be presented over a voice channel to the PBX as a series of DTMF tones (typically at least 5 tones). Upon reception of the tones at the PBX from the mobile device, these tones (or data representative of them) can be sent from the PBX to the server, which determines whether or not the DTMF tones represent the authentication token that was provided to the mobile device. If so, then authorization for the call to proceed is granted. Such an approach may require several seconds (around 4 or more seconds) to complete, at least because DTMF tones require a guardband of time between each tone, and the tones require some time for processing. Thus, using an authentication token long enough to provide reasonable security results in a delay longer than desirable.

In one aspect disclosed herein, a mobile device indicates over a data channel that a call is to be made (as described above). The server likewise responds with an authentication token. The mobile device can call a DNIS telephone number, in order to reach the PBX. The PBX gathers ANI information for that call (and/or caller identification information). The ANI information is provided to the server. The server determines whether the ANI information matches to an authorized user of the system (e.g., matches to identification information, such as a phone number, associated with a device issued to an employee of a company controlling the PBX.

If the ANI information (or other identifying information) matches, then the server can generate a trigger code comprising one or more DTMF tones (e.g., such tones can be predetermined to be associated with the trigger functionality described), to be sent over the voice channel between the PBX and the mobile device. The mobile device receives these tone(s), and interprets these tone(s) to indicate that the authentication token need not be transmitted over the voice channel to the PBX. The mobile device can respond with one or more acknowledgement tones, allowing the call to proceed. In this example, the total number of DTMF tones exchanged over the voice channel to enable the mobile device to be authenticated and the call to proceed has been reduced. In some implementations, such reduction in DTMF tones allows several seconds faster setup time for a call, which enhances responsiveness of the system to mobile device service needs.

FIG. 1 depicts an example arrangement, which will be used in the following description. In some aspects, this description concerns an approach to reducing a setup time for a call involving a wireless device and carried on a transport that includes elements of the Public Switched Telephony Network (PSTN). The elements of FIG. 1 are introduced, followed with background to provide context to the particular examples that follow.

FIG. 1 depicts an arrangement where a PBX 16 can exist within a corporate network. PBX 16 can be coupled to the Public Switched Telephone Network (PSTN) 40, such as via a T1 trunk, or through a gateway 13 that interfaces between the PSTN and a packet network technology. Gateway 13 also can convert between packet network signaling to PSTN signaling PBX 16 also can be coupled to the Internet 40, or to other packet networks, through a firewall 22, and other network equipment such as routers and switches (not separately depicted). PBX 16 also can have a connection to both the PSTN and one or more packet networks.

Traditionally, a PBX (e.g., PBX 16) provides telephony services for a closed group of private telephones, for example, within an enterprise or a hotel. However, in many cases the services to the private telephone desirably could also be extended out to a mobile device that communicate via third party networks, such as wide area cellular networks, or through wireless local area networks. In these situations SMP server 18 may be added as an adjunct to the PBX and can take an active role in providing services to mobile devices.

SMP server 18 can be connected to PBX 16 through a packet-switched connection that can use the Internet Protocol (IP).

PSTN 40 can communicate with Public Land Mobile Network (PLMN) 50, and by particular example, with a switching control 86 within PLMN 50. Such communication is for accepting calls from PLMN 50 to be carried on PSTN 40, and vice versa, as an example. SS7 signalling can be employed between PSTN 40 and PLMN 50. PSTN 40 is depicted to have telephones 87a and 87b coupled thereto. Other implementations can include multiple gateways that translate between or among different signaling protocols.

PLMN 50 communicates with a mobile device 11. Communication between PLMN 50 and mobile device 11 can take place using a wide variety of technologies, some of which are capable of supporting only voice traffic, either voice traffic and data traffic, or simultaneous voice and data traffic to/from mobile device 11. PLMN 50 also can use Internet 40 to receive/send traffic to and from corporate network 20, as indicated by communication link 92. Communication between network 20 and PLMN 50 also may be carried via a relay 26. Relay 26 may provide, for example, a leased line access to one or more PLMNs 50, or to equipment hosted within such PLMNs 50. As such, public packet networks (e.g., Internet 50) are not necessarily used in some examples.

Mobile device 11 includes one or more radio transceivers and associated processing hardware and software to enable wireless communications with the PLMN 50 and optionally a WLAN. In various embodiments, the PLMN 50 and mobile device 11 may be configured to operate in compliance with any one or more of a number of wireless protocols, including GSM, GPRS, CDMA, EDGE, UMTS, EvDO, HSPA, 3GPP, or a variety of others. It will be appreciated that the mobile device 11 may roam within PLMN 50 as well as into other PLMNs (i.e., that the depicted PLMN 50 represents one or more such wireless access networks that operate according to what a person of ordinary skill would understand as broadband cellular access technologies).

For example, in some instances, a dual-mode mobile device 11 and/or the enterprise network 20 can be configured to facilitate roaming between the PLMN 50 and a WLAN, and are thus capable of seamlessly transferring sessions (such as voice calls) from a connection with a cellular interface of a dual-mode device to a WLAN interface of such a dual-mode device, and vice versa.

GSM signaling 91 can be implemented using the Fast Associated Control Channel (FACCH). FACCH is a logical channel on a digital traffic channel that can be used to send urgent signaling control messages. The FACCH channel sends messages by replacing speech data with signaling data for short periods of time. In GSM, two special reserved bits are used to inform the receiving device if the data in the current time slot is digitally coded subscriber traffic or alternatively a FACCH message. Switching control 86 manages the conversion between GSM signaling 91 and SS7 signaling 90 (for clarity, a network of base stations operating within PLMN 50 is not separately depicted, and usually, there is a connection between switching control 86, and one or more base station elements, where device 11 can be connected to such base station elements. GSM signaling can be relayed through the base station to a termination point in switching control 86.)

In some embodiments, PBX 16 may be connected to one or more conventional analog telephones 19. The PBX 16 is also connected to (or part of) the enterprise network 20 and, through it, to telephone terminal devices, such as digital telephone sets 17, softphones operating on computers 15, and so on. Within the enterprise network, each individual may have an associated extension number, sometimes referred to as a PNP (private numbering plan), or direct dial phone number. Calls outgoing from PBX 16 to PSTN 40 or incoming from PSTN 40 to PBX 16 can be circuit-switched calls (typically in the absence of gateway 13). Gateway 13 also can be considered part of enterprise network 20, and a boundary of such enterprise network 20 depicted in FIG. 1 is primarily for convenience. Within the enterprise, e.g. between the PBX 16 and terminal devices, voice calls are increasingly packet-switched calls, for example Voice-over-IP (VoIP) calls.

SMP server 18 can perform some aspects of messaging or session control, like call control and advanced call processing features. SMP server 18 may, in some cases, also perform some media handling. Collectively, SMP server 18 and PBX 16 may be referred to as the enterprise communications platform (server), generally designated 14. It will be appreciated that the enterprise communications platform 14 and, in particular, SMP server 18, can be implemented on one or more servers having suitable communications interfaces for connecting to and communicating with the PBX 16, and other network connections. Although SMP server 18 may be implemented on a stand-alone server, it will be appreciated that it may be implemented into an existing control agent/server as a software component comprising instructions configuring a processor, operating with other software components to implement the functionality attributed to it. As will be described below, SMP server 18 may be implemented as a multi-layer platform.

The enterprise communications platform 14 implements the switching to connect session legs and may provide the conversion between, for example, a circuit-switched call and a VoIP call, or to connect legs of other media sessions. In some embodiments, in the context of voice calls the enterprise communications platform 14 provides a number of additional functions including automated attendant, interactive voice response, call forwarding, voice mail, etc. It may also implement certain usage restrictions on enterprise users, such as blocking international calls or 1-900 calls. In many embodiments, Session Initiation Protocol (SIP) may be used to setup, manage, and terminate media sessions for voice calls. Other protocols may also be employed by the enterprise communications platform 14, for example, Web Services, Computer Telephony Integration (CTI) protocol, Session Initiation Protocol for Instant Messaging and Presence Leveraging Extensions (SIMPLE), and various custom Application Programming Interfaces (APIs).

One of the functions of enterprise communications platform 14 is to extend the features of enterprise telephony to the mobile devices 11. For example, the enterprise communications platform 14 can allow mobile device 11 to perform functions akin to those normally available on a standard office telephone, such as the digital telephone set 17 or analog telephone set 15. Example features may include direct extension dialing, enterprise voice mail, conferencing, call transfer, call park, etc.

The depicted system may include a number of enterprise-associated mobile devices (device 11 is depicted). Device 11 can be a device equipped for cellular communication through the PLMN 50, or a dual-mode device capable of both cellular and WLAN communications.

Enterprise network 20 typically includes a number of networked servers, computers, and other devices. For example, enterprise network 20 may connect one or more desktop or laptop computers 15 (one shown). The connection may be wired or wireless in some embodiments. The enterprise network 20 may also connect to one or more digital telephone sets 17 (one shown).

Now turning to FIGS. 2-4, methods of establishing calls involving mobile device 11 will be explained, in view of the logical communications depicted in FIG. 2, the mobile device method of FIG. 3, and the server-oriented method of FIG. 4.

Figure 2:
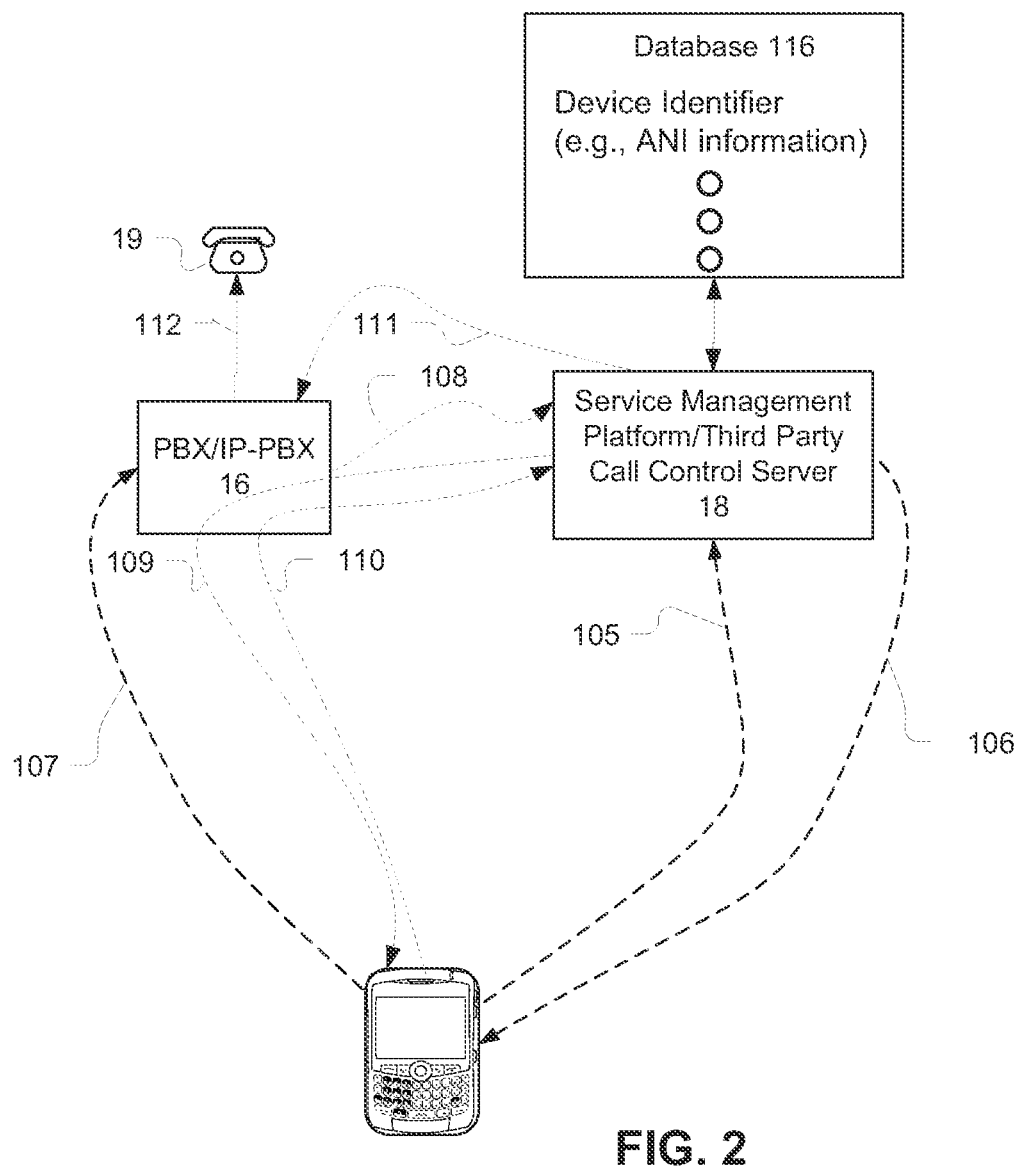
FIG. 2 depicts aspects of a logical communications flow for setting up a voice telephony call according to exemplary aspects described herein.
Figure 3:
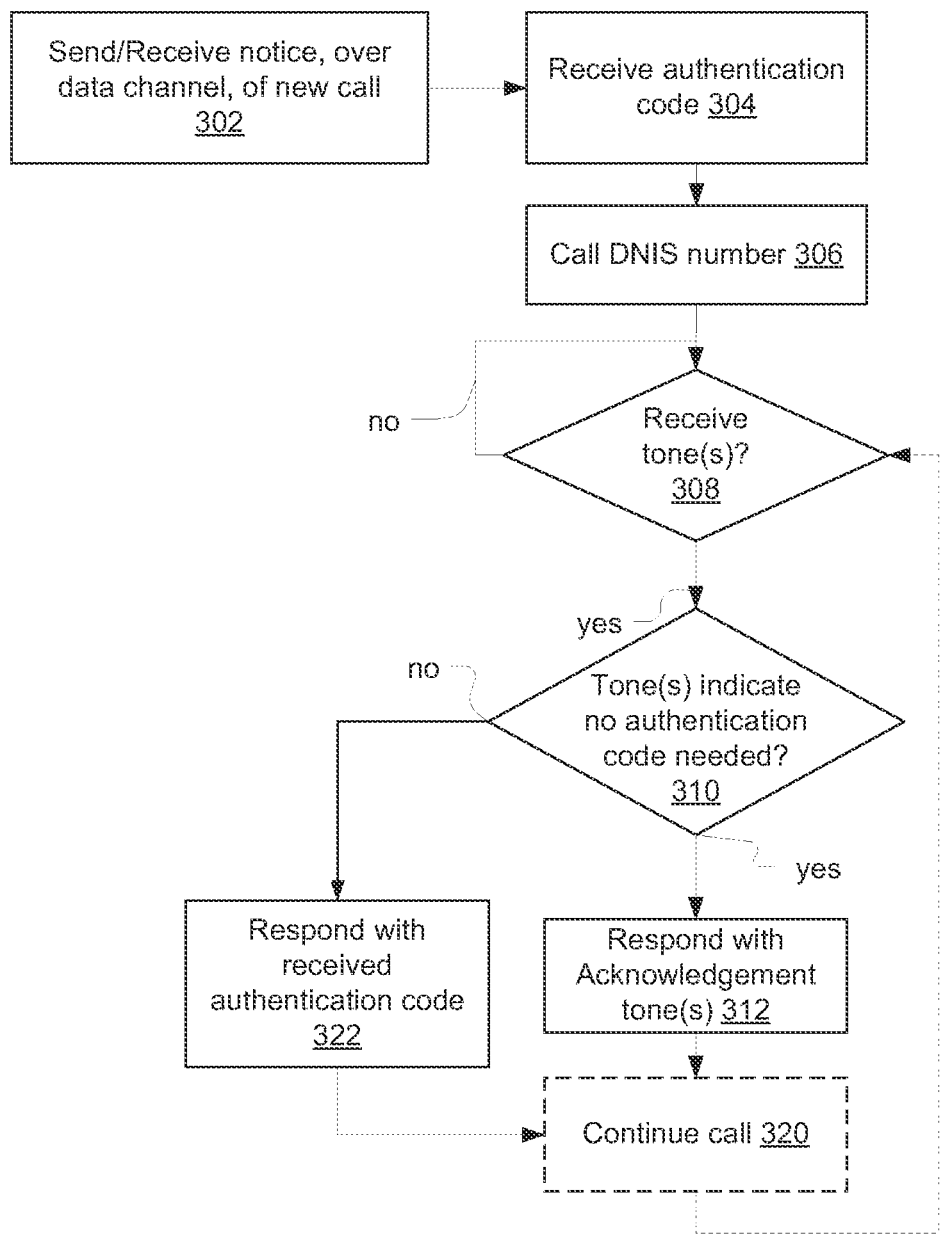
FIG. 3 depicts aspects of an example method that can be implemented on a mobile device participating in call setup according to this disclosure.

FIG. 3 depicts that mobile device 11 can send a notice (e.g., a message) indicative of a call to be made (or receive a notice, as would occur in a call incoming to PBX 16 was available); the notice is transmitted over a data channel. Such a data channel is depicted logically in FIG. 2 as communication 105 from device 11 to SMP 18. Communication 105 can travel over PLMN 50, and through relay 26, or through another data connection, such as WiFi, depicted as wife base station 99 in FIG. 1, over Internet 40.

SMP 18 responds with communication 106, which includes an authentication token. Communication 106 can be sent similarly to the approach of communication 105. The method of FIG. 3 includes receiving the authentication token of communication 106, and calling a DNIS number (306). The calling of the DNIS number is depicted in FIG. 2 as communication 107 to PBX 16, which would typically occur over PLMN 50 and PSTN 40, and which also could occur over WiFi, and Internet 40 coupled to gateway 13 or to PSTN 40. ANI information obtained for this case is compared with a database (116) of authorized devices, in order to determine whether the ANI information matches to an authorized device. If so, then the authentication token can be determined to be unnecessary for the mobile device 11 to provide on the voice channel. This decision can be communicated to device 11, as explained below.

Upon establishing communication with PBX 16 over the voice channel, mobile device waits (represented by "no" loop) to receive (308) one or more DTMF tones over the voice channel (such tones are represented by communication 109 in FIG. 2, and which occurs over the established voice channel). Upon receiving tones, mobile device 11 determines (310) whether the received tone(s) represent a trigger indicating that mobile device 11 need not send the authentication token over the voice channel that was received by mobile device 11.

If the determination indicates that the sending of the authentication token can be dispensed, then mobile device responds with one or more DTMF acknowledgement tones (312), as indicated by communication 110 in FIG. 2, also over the voice channel. If determination (310) indicates to send the authentication token, then mobile device 11 responds by providing (322) DTMF tones representative of the authentication token (also represented by communication 110 of FIG. 2). Assuming that the authentication token is correctly received, then the call can continue (320) thereafter (which will be explained further with respect to FIG. 4). The call continue (320) is depicted with dashes to indicate that if the call is not completed on the server/PBX side, then device 11 can wait to receive further tones, or may ultimately time out and retry.

Figure 4:
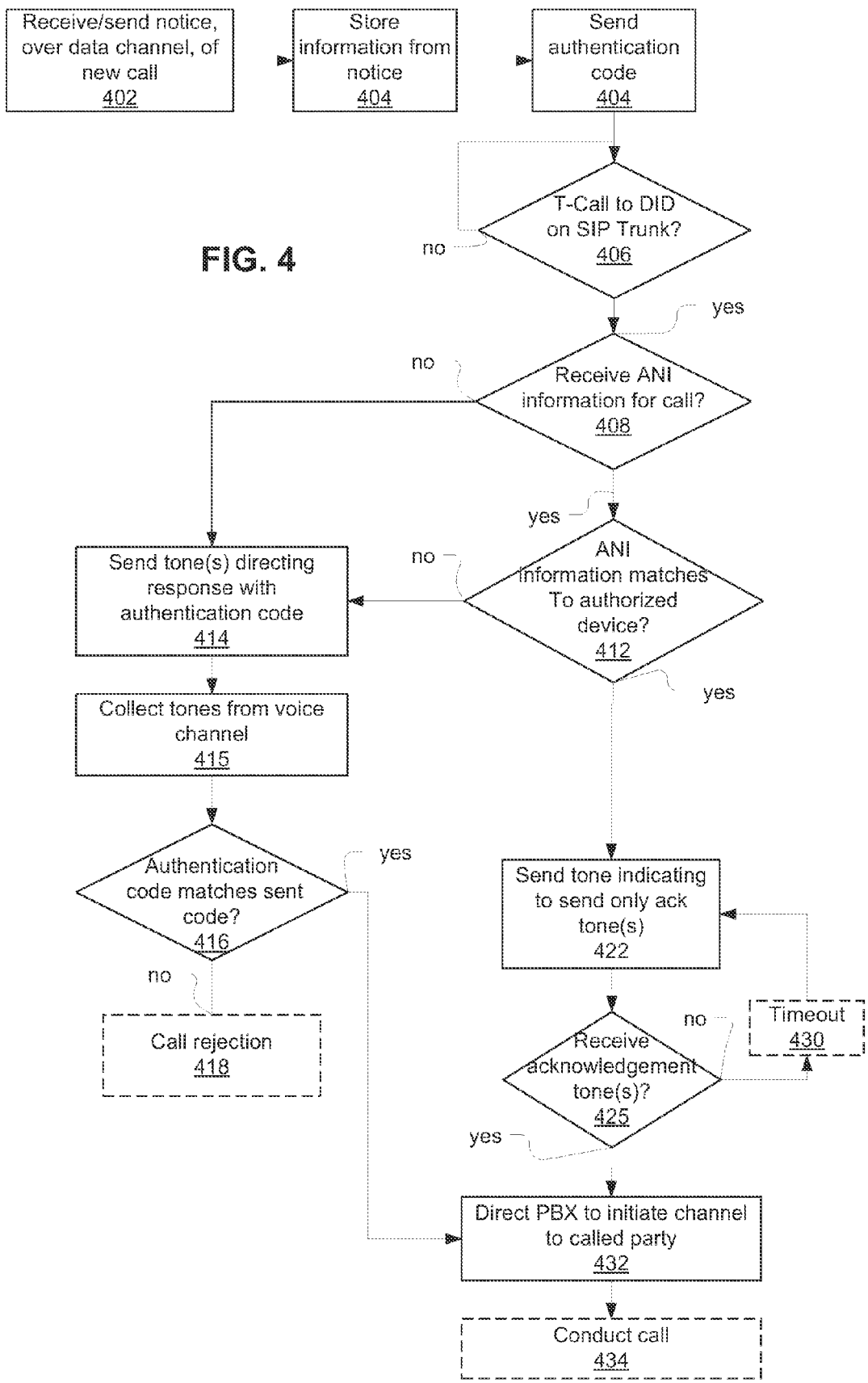
FIG. 4 depicts aspects of an example method that can be implemented on a server participating in call setup according to this disclosure.

FIG. 4 depicts a counterpart method implemented at one or more of SMP 18 and PBX 16. FIG. 4 depicts that the call notice of (302) is received (call to be made on behalf of device 11) or sent (i.e., call at PBX for device 11) (402). Information provided in the notice is stored (403), such information would typically include an identifier for device 11, such as a telephone number, as well as information for the party to be called. Responsive to the notice, an authentication token can be sent (the corresponding communications of FIG. 2 are described above with respect to FIG. 3). PBX 16 can await an incoming call (406) on a DNIS number, such incoming call can be on a SIP trunk. PBX 16 generally would be able to receive a call at the DNIS number at any time, from any party, and as such, the sequential presentation of FIG. 4 does not imply that accepting an incoming call is dependent on the occurrence of other aspects disclosed). SMP 18 receives ANI information (or in the absence or additional to ANI information, caller ID information can be received). Such ANI information can be captured by PBX 16 and provided to SMP 18. In some cases, ANI information may be unavailable (408) (and caller ID information may be deemed unacceptable or is also unavailable). In such a case, SMP 18 responds (414) with one or more tone(s) indicating that device 11 should respond with the authentication token provided. If ANI information is available (depending on implementation, caller ID information can be substituted for ANI information herein), then SMP 18 attempts to match the ANI information to a database or list of authorized devices (412). If the ANI information matches, then SMP 18 responds with one or more DTMF tones indicating that only an acknowledgement tone(s) and not the full authentication token is sufficient (422).

Thereafter, the acknowledgement tone(s) can be received (425) (and SMP 18 can wait, subject to timeout 430 to receive such tones). SMP 18 can signal/direct (432) PBX 16 to initiate a voice channel to the called party, as represented by communication 111 of FIG. 2 (which can be specified in the notice received at 402). The voice channel is represented by communication 112 in FIG. 2. That call to the called party can be bridged with the established voice channel to mobile device 11. If the authentication token matched (416) or if the acknowledgement approach was successful, then the call can be conducted (434). If tones received after 414 did not match the previously-provided authentication token, then the call can be rejected (418). As another example, device 11 may be directed to send the authentication token again.

Although not explicitly the focus of the method depicted in FIG. 4, if the authentication token is provided, even though it was not requested, the call can also be authorized. Further, other variations can be introduced, such as PBX 16 starting to initiate a call to the called party concurrently with the authentication/acknowledgement of device 11.

Figure 5:
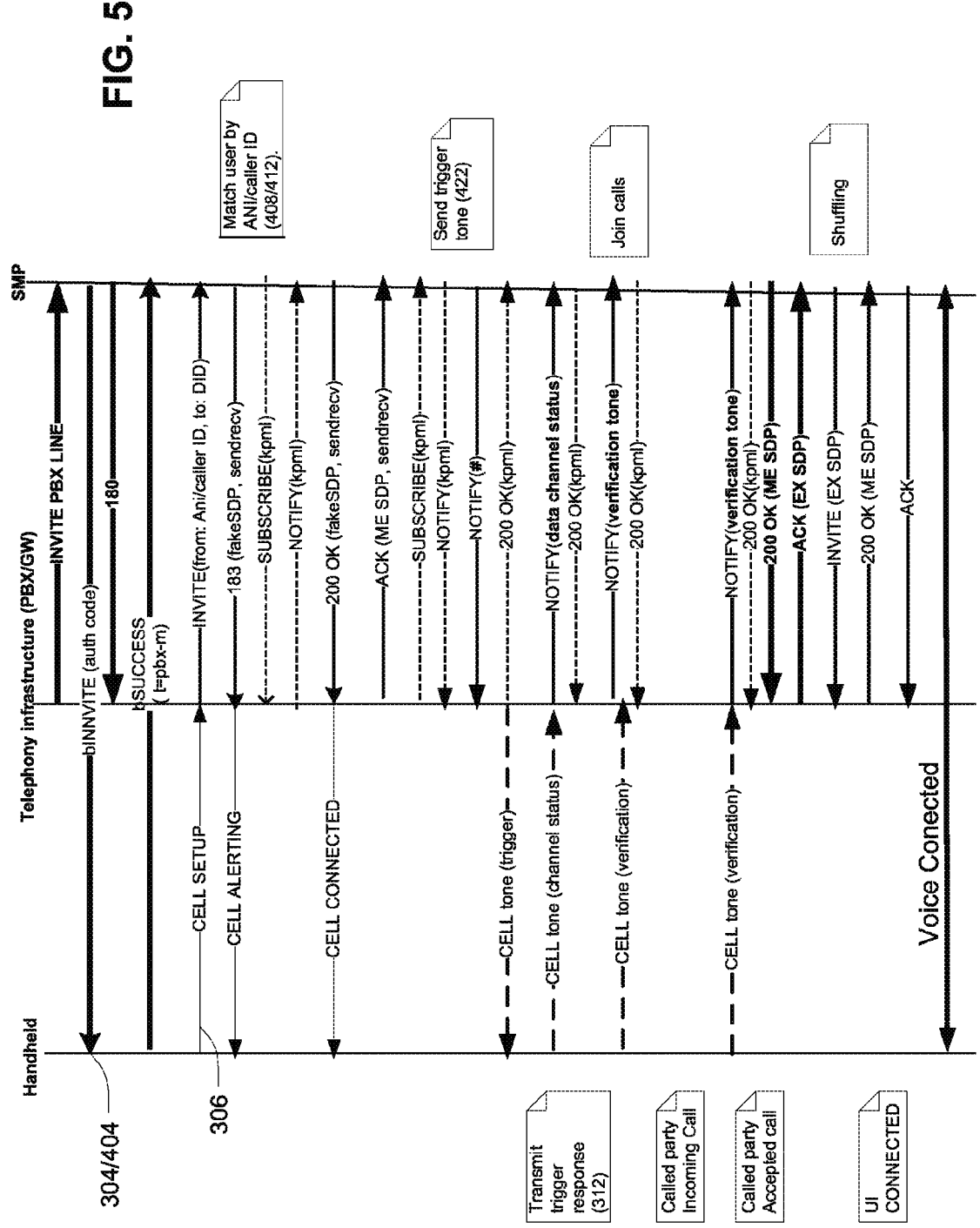
FIG. 5 depicts a signal diagram according to an example process for establishing a call according to these disclosures.

FIG. 5 depicts a signal flow where a call can originate at PBX 16 (e.g., by a party calling a number that should ring mobile device 11). In this situation, a principal difference is that the notice of 302/402 would be inapplicable, and instead, an invite (over data service) including the token (404) can be sent after SMP 18 receives an indication that the PBX 16 has an incoming call for mobile device 11. The signal flow is largely self-explanatory and concerns an example where the authentication token is not provided, and instead, ANI information is used to match with a database of authorized subscribers (e.g., database 116 of FIG. 2), allowing a reduced DTMF tone exchange. FIG. 5 also includes information about signal flows that may vary amongst implementations. Various portions of the methods of FIG. 3 and FIG. 4 are identified in FIG. 5 as well.

Figure 6:
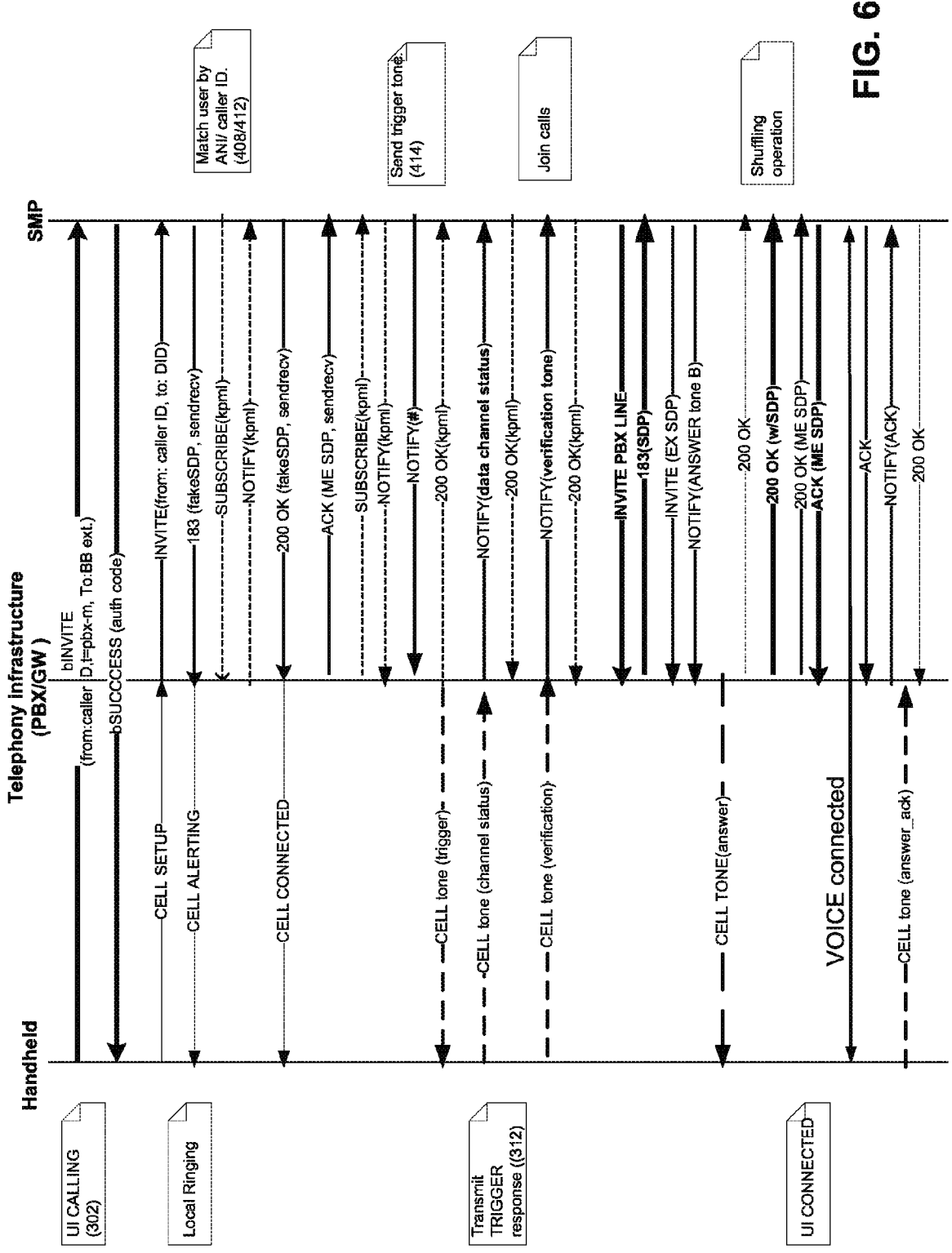
FIG. 6 depicts another signal diagram according to another example process for establishing a call according to these disclosures.

FIG. 6 depicts a flow where mobile device 11 originates the call (which is generally in accordance with the methods depicted in FIGS. 3 and 4). The flow of FIG. 6 also is generally self-explanatory and concerns a situation where the ANI information matched, such that the authentication token is indicated to be unnecessary, allowing a more responsive authorization process. Various elements from FIGS. 3 and 4 are identified in FIG. 6.

Figure 7:
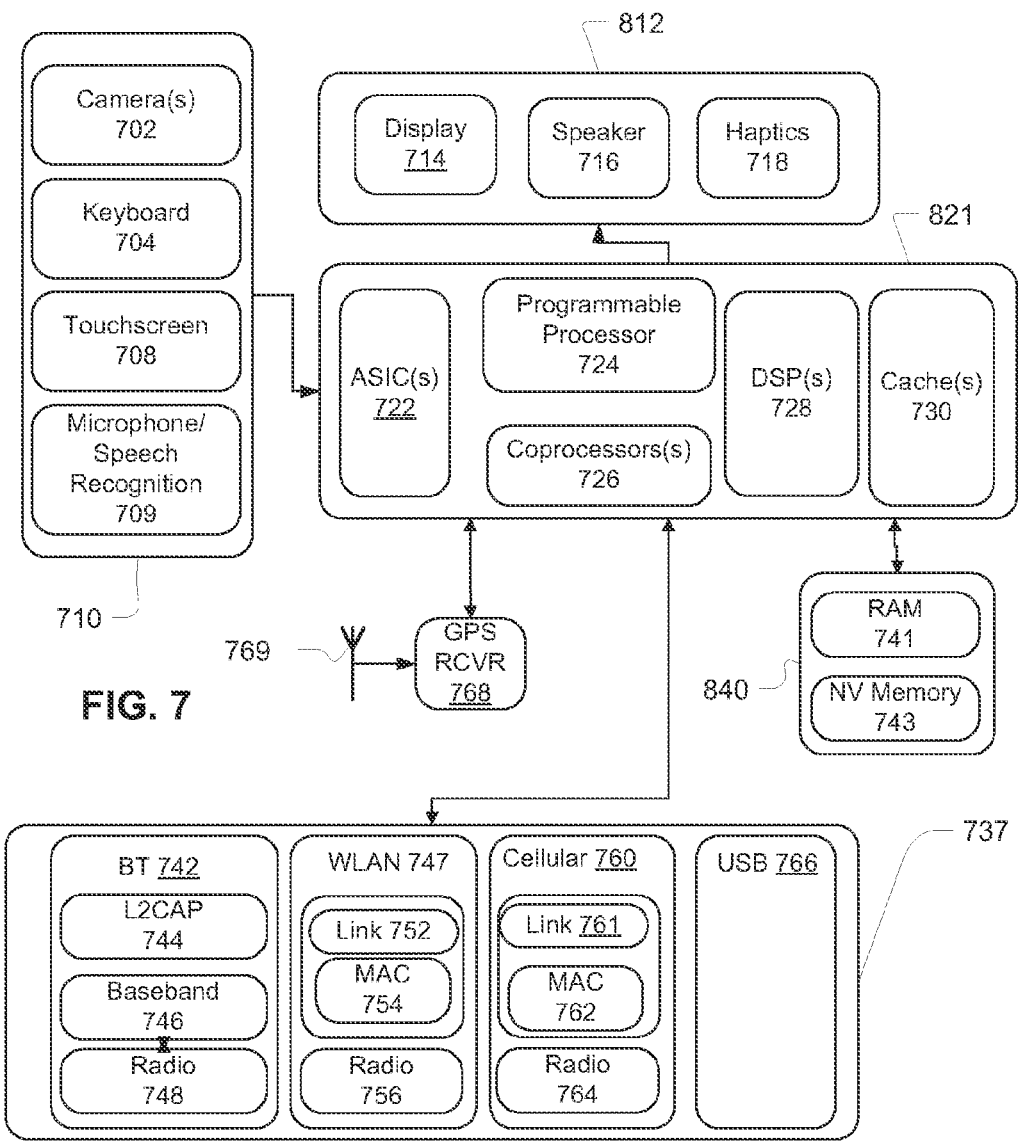
FIG. 7 depicts an example composition of a mobile device that can perform aspects in accordance with this disclosure.

FIG. 7 depicts example components that can be used in implementing a mobile transceiver device 11 according to the above description. FIG. 2 depicts that a processing module 721 may be composed of a plurality of different processing elements, including one or more ASICs 722, a programmable processor 724, one or more co-processors 726, which each can be fixed function, reconfigurable or programmable, one or more digital signal processors 728. For example, an ASIC or co-processor 722 may be provided for implementing graphics functionality, encryption and decryption, audio filtering, and other such functions that often involve many repetitive, math-intensive steps. Processing module 721 can comprise memory to be used during processing, such as one or more cache memories 730.

Processing module 721 communicates with mass storage 740, which can be composed of a Random Access Memory 741 and of non-volatile memory 743. Non-volatile memory 743 can be implemented with one or more of Flash memory, PROM, EPROM, and so on. Non-volatile memory 743 can be implemented as flash memory, ferromagnetic, phase-change memory, and other non-volatile memory technologies. Non-volatile memory 743 also can store programs, device state, various user information, one or more operating systems, device configuration data, and other data that may need to be accessed persistently.

User input interface 710 can comprise a plurality of different sources of user input, such as a camera 702, a keyboard 704, a touchscreen 708, and a microphone, which can provide input to speech recognition functionality 709.

Processing module 721 also can use a variety of network communication protocols, grouped for description purposes here into a communication module 737, which can include a Bluetooth communication stack 742, which comprises a L2CAP layer 744, a baseband 746 and a radio 748. Communications module 737 also can comprise a Wireless Local Area Network (747) interface, which comprises a link layer 752 with a MAC 754, and a radio 756. Communications module 737 also can comprise a cellular broadband data network interface 760, which in turn comprises a link layer 761, with MAC 762. Cellular interface 760 also can comprise a radio for an appropriate frequency spectrum 764. Communications module 737 also can comprise a USB interface 766, to provide wired data communication capability. Other wireless and wired communication technologies also can be provided, and this description is exemplary.

Figure 8:
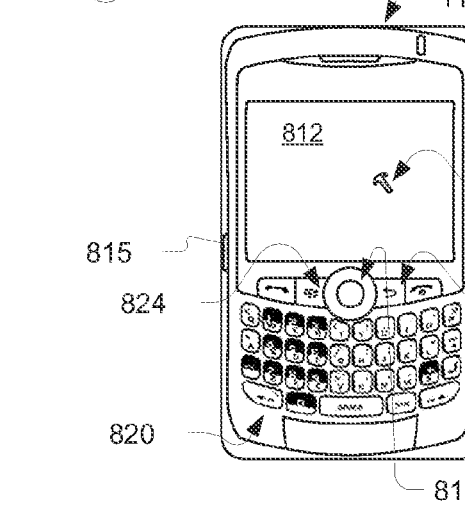
FIG. 8 depicts another view of an example of a mobile device that can perform aspects in accordance with this disclosure.

Referring to FIG. 8, there is depicted an example of mobile device 11. Mobile device 11 comprises a display 812 and a cursor or view positioning device, here depicted as a trackball 814, which may serve as another input member and is both rotational to provide selection inputs and can also be pressed in a direction generally toward housing to provide another selection input. Trackball 814 permits multi-directional positioning of a selection cursor 818, such that the selection cursor 818 can be moved in an upward direction, in a downward direction and, if desired and/or permitted, in any diagonal direction. The trackball 814 is in this example situated on a front face (not separately numbered) of a housing 820, to enable a user to maneuver the trackball 814 while holding mobile device 11 in one hand. In other embodiments, a trackpad or other navigational control device can be implemented as well.

The mobile device 11 in FIG. 8 also comprises a programmable convenience button 815 to activate a selected application such as, for example, a calendar or calculator. Further, mobile device 11 can include an escape or cancel button 816, a menu or option button 824 and a keyboard 820. Menu or option button 824 loads a menu or list of options on display 812 when pressed. In this example, the escape or cancel button 816, menu option button 824, and keyboard 829 are disposed on the front face of the mobile device housing, while the convenience button 815 is disposed at the side of the housing. This button placement enables a user to operate these buttons while holding mobile device 11 in one hand. The keyboard 829 is, in this example, a standard QWERTY keyboard.

Figure 9:
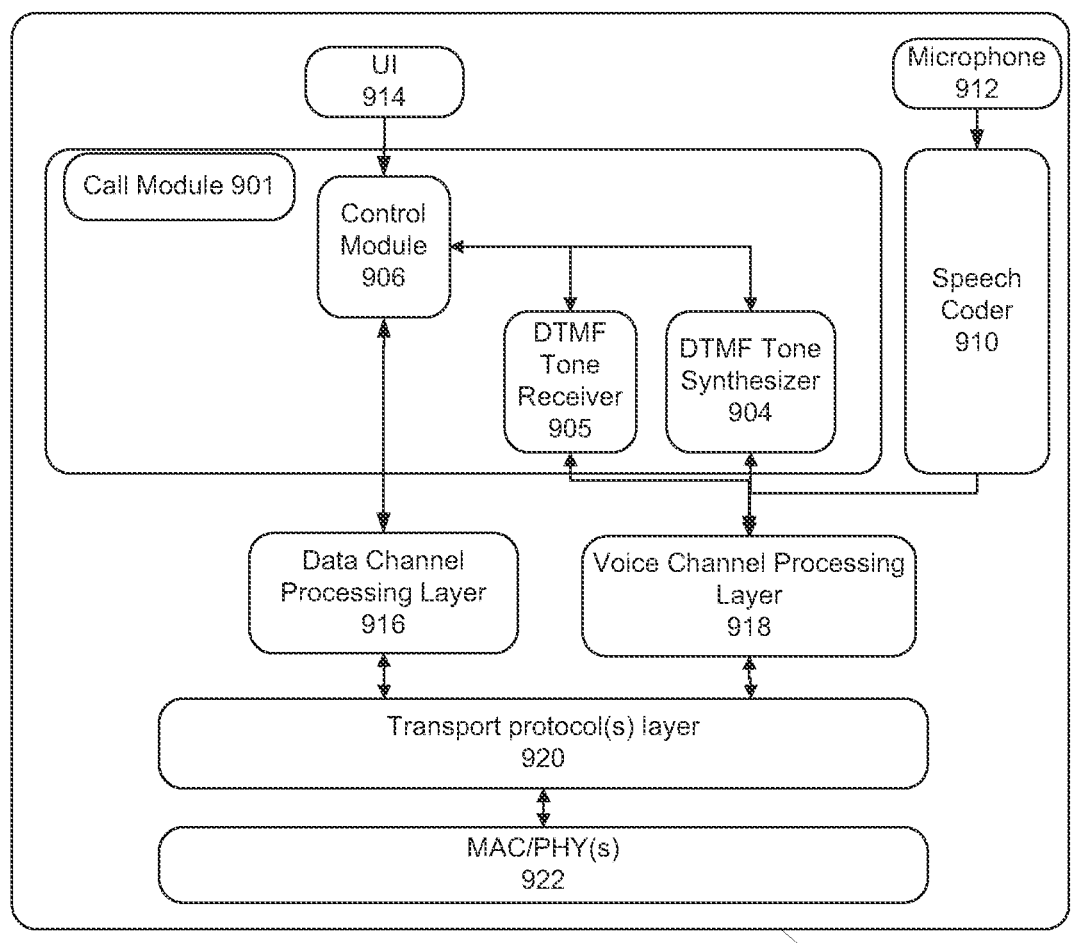
FIG. 9 depicts a functional module composition of a mobile device in accordance with this disclosure.

FIG. 9 depicts an example functional module organization of mobile device 11, and which includes a call module 901. Call module 901 device 11 includes Media Access Controller(s) and PHYsical media layers that can be managed by the MACs (922) and a transport protocol(s) module 920 interfaced with the MAC/PHYs. A voice channel processing layer module 918 interfaces with transport control (20), and receives input from a DTMF tone synthesizer and a speech coder 910 that receives input from a microphone 912. Voice channel processing layer 918 also interfaces with a DTMF tone receiver 905 that can detect DTMF tones sent on a voice channel involving transport control 920 and MAC/PHY 922. A control module 906 also can interface with each of DTMF tone receiver 905 and synthesizer 904 to both receive information represented by received tones and generate information to be sent using DTMF tones. A UI 914 interfaces with control module 906. Transport module in turn interfaces with one or more MAC/PHY modules 922. Collectively, voice channel processing module 918, transport module 920, and MAC/PHY module(s) 922 provide a stack for transmission and reception of voice information for a call, as well as command and status information relating to such call.

In the foregoing, separate boxes or illustrated separation of functional elements of illustrated systems does not necessarily require physical separation of such functions, as communications between such elements can occur by way of messaging, function calls, shared memory space, and so on, without any such physical separation. As such, functions need not be implemented in physically or logically separated platforms, although they are illustrated separately for ease of explanation herein. In particular, a PBX and a server that can communicate with a device over a data channel can be implemented in separate devices, or as different software-based functions on a single device, such as using separate processes running on a processor or group of processors (more generally, a processing resource or resources). These aspects can be implementation-specific, and a variety of implementations would occur to those of ordinary skill in view of these disclosures.

For example, different embodiments of devices can provide some functions in an operating system installation that are provided at an application layer or in a middle layer in other devices. Different devices can have different designs, such that while some devices implement some functions in fixed function hardware, other devices can implement such functions in a programmable processor with computer code obtained from a computer readable medium.

Further, some aspects may be disclosed with respect to only certain examples. However, such disclosures are not to be implied as requiring that such aspects be used only in embodiments according to such examples.

The above description occasionally describes relative timing of events, signals, actions, and the like as occurring "when" another event, signal, action, or the like happens. Such description is not to be construed as requiring a concurrency or any absolute timing, unless otherwise indicated.

Certain adaptations and modifications of the described embodiments can be made. Aspects that can be applied to various embodiments may have been described with respect to only a portion of those embodiments, for sake of clarity. However, it is to be understood that these aspects can be provided in or applied to other embodiments as well. Therefore, the above discussed embodiments are considered to be illustrative and not restrictive.

What is claimed is:

1. A method of establishing a voice communication session, comprising:
    receiving at a mobile device, over a data channel, an authentication token that can be used to authenticate the mobile device on a voice channel;
    initiating establishment of the voice channel between a telephony system and the mobile device, the telephony system communicatively coupled with a server;
    receiving at the mobile device, from the server, on the voice channel, at least one Dual-tone Multi-frequency (DTMF) tone indicating that information about the mobile device was obtained during the establishment of the voice channel and was matched with a database of authorized devices, and responsively sending, from the calling device, on the voice channel, an acknowledgement DTMF tone;
    proceeding with the voice communication session over the voice channel; and sending from the mobile device, on a data channel, a notification of initiation of a call to be carried on a voice channel, and wherein the authentication code is sent responsive to the notification by the server.

2. The method of claim 1, wherein the information obtained during establishment of voice channel comprises Automatic Number Identification (ANI) information.

3. The method of claim 1, wherein the calling device initiates the establishment of the voice channel by calling a pre-determined telephone number.

4. The method of claim 1, wherein the acknowledgement DTMF tone comprises two or more DTMF tones, at least one of the two or more DTMF tones relating to whether the mobile device can support a data channel concurrently with a voice channel.

5. The method of claim 1, wherein the mobile device is capable of operating according to Global Systems for Mobile Communication (GSM) standard for voice telephony signaling.

6. A method of establishing a voice communication session, comprising:
    receiving at a mobile device, over a data channel, an authentication token that can be used to authenticate the mobile device on a voice channel;
    initiating establishment of the voice channel between a telephony system and the mobile device, the telephony system communicatively coupled with a server;
    receiving at the mobile device, from the server, on the voice channel, at least one dual-tone multi-frequency (DTMF) tone indicating that information about the mobile device was obtained during the establishment of the voice channel and was matched with a database of authorized devices, and responsively sending, from the calling device, on the voice channel, an acknowledgement DTMF tone;
    proceeding with the voice communication session over the voice channel; and if the tone is not received by the mobile device, sending the authentication token as DTMF tones on the voice channel.

7. A mobile device capable of voice telephony, comprising:
    one or more network interfaces capable of interfacing with one or more networks to provide a data communication channel and a voice communication channel; and
    a processing resource configured to interface with the one or more network interfaces and to perform a method comprising:
    receiving at the mobile device, over a data channel, an authentication token that can be used to authenticate the mobile device on a voice channel;
    initiating establishment of the voice channel between a telephony system and the mobile device, the telephony system communicatively coupled with a server;
    receiving at the mobile device, from the server, on the voice channel, at least one Dual-tone Multi-frequency (DTMF tone indicating that information about the mobile device was obtained during the establishment of the voice channel and was matched with a database of authorized devices, and responsively sending, from the calling device, on the voice channel, an acknowledgement DTMF tone; and
    proceeding with the voice communication session over the voice channel,
    wherein the processing resource is further configured for receiving, on the data channel, a notification of availability of a call, and the authentication token is provided with the notification.

8. The mobile device of claim 7, wherein the one or more network interfaces comprise an interface to a cellular network, over which is implemented the voice communication channel and the data communication channel.

9. The mobile device of claim 7, wherein the processing resource is further configured for sending, on the data channel, a notification of initiation of a call to be carried on a voice channel, the notification for receipt by the server and comprising information identifying the mobile device and a party to be called.

10. The mobile device of claim 7, wherein the one or more network interfaces are configured to provide alternatively either the voice communication channel or the data communication channel.

11. A mobile device of claim 10, wherein the one or more network interfaces comprises an interface for a Global Systems for Mobile Communication/General Packet Radio Service GSM/GPRS network.

12. A non-transitory computer readable medium storing instructions for a programming a processor provided with a mobile device to perform a method comprising:

sending from a calling device, on a data channel, a notification of initiation of a call to be carried on a voice channel, the notification for receipt by a server and comprising information identifying the calling device and a party to be called;

responsively receiving, over the data channel, an authentication token that can be used to authenticate the calling device to the server;

initiating establishment of the voice channel between a telephony system and the calling device, the telephony system communicatively coupled with the server;

receiving, from the server, on the voice channel, at least one Dual-tone Multi-frequency (DTMF) tone indicating that information about the calling device was obtained during the establishment of the voice channel and was matched with the information identifying the calling device contained in the notification, and responsively sending, from the calling device, on the voice channel, an acknowledgement DTMF tone; and proceeding with the voice communication session over the voice channel, wherein, if the tone is not received by the calling device, then sending the authentication token as DTMF tones on the voice channel.

13. The non-transitory computer readable medium of claim 12, wherein the information obtained during establishment of voice channel comprises Automatic Number Identification (ANI) information.

14. The non-transitory computer readable medium of claim 12, wherein the calling device initiates the establishment of the voice channel by calling a pre-determined telephone number.

15. The non-transitory computer readable medium of claim 12, wherein the acknowledgement DTMF tone comprises two or more DTMF tones, at least one of the two or more DTMF tones relating to whether the calling device can support a data channel concurrently with a voice channel.

16. A method of providing voice telephony services to a mobile device, comprising:

receiving, at an application server, a notification of a call to involve a mobile device and to be carried on a voice channel;

sending to the mobile device, over a data channel, an authorization token that can be used to authenticate the mobile device to the application server;

receiving Automatic Number Identification (ANI) information for a call incoming to a telephony system on a voice channel, the telephony system communicatively coupled with the application server;

determining whether the received ANI information matches to the mobile device identified in the notification, and responsively sending, on the voice channel, at least one Dual-tone Multi-frequency (DTMF) tone indicating authorization to use an abbreviated authentication procedure comprising sending fewer DTMF tones than a number of tones in the authorization token;

provisioning a voice channel to the party to be called, for bridging with the voice channel for the call incoming to the telephony system; and responsive to determining that the received ANI information does not match to the mobile device, indicating to the mobile device to provide the authorization token on the voice channel.

* * * * *